US012587458B2

(12) United States Patent
Hegde et al.

(10) Patent No.: US 12,587,458 B2
(45) Date of Patent: Mar. 24, 2026

(54) AUTOSPAN NETWORK TRAFFIC BASED ON MONITORED APPLICATIONS

(71) Applicant: Arista Networks, Inc., Santa Clara, CA (US)

(72) Inventors: Shashank Hegde, Sunnyvale, CA (US); Sandip Shah, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/602,756

(22) Filed: Mar. 12, 2024

(65) Prior Publication Data

US 2025/0097128 A1     Mar. 20, 2025

Related U.S. Application Data

(60) Provisional application No. 63/584,126, filed on Sep. 20, 2023.

(51) Int. Cl.
| | |
|---|---|
| *H04L 43/062* | (2022.01) |
| *H04L 41/082* | (2022.01) |
| *H04L 43/12* | (2022.01) |

(52) U.S. Cl.
CPC .......... *H04L 43/062* (2013.01); *H04L 41/082* (2013.01); *H04L 43/12* (2013.01)

(58) Field of Classification Search
None
See application file for complete search history.

(56) References Cited

U.S. PATENT DOCUMENTS

| | | | | |
|---|---|---|---|---|
| 12,218,819 | B1 * | 2/2025 | Georgalis | ............ H04L 43/0811 |
| 2016/0218949 | A1 * | 7/2016 | Dasgupta | ............ G06F 11/3409 |
| 2018/0176106 | A1 * | 6/2018 | Raney | ...................... H04L 43/20 |
| 2021/0409299 | A1 * | 12/2021 | Florian | ............... H04L 12/4633 |

* cited by examiner

*Primary Examiner* — Natisha D Cox
(74) *Attorney, Agent, or Firm* — Fountainhead Law Group, PC

(57) ABSTRACT

The present disclosure is directed to capturing network traffic for analysis. The present disclosure describes techniques to automate setting up a monitoring session for an application. The technique allows a user to set up a monitoring session by specifying the application to be monitored and one or more monitoring destinations (e.g., monitoring tools, monitoring fabric, etc.). The monitoring session can then be autonomously set up by the system without further input from the user.

18 Claims, 6 Drawing Sheets monitoring session

AUTOSPAN NETWORK TRAFFIC BASED ON MONITORED APPLICATIONS

CROSS REFERENCE TO RELATED APPLICATIONS

Pursuant to 35 U.S.C. § 119(e), this application is entitled to and claims the benefit of the filing date of U.S. Provisional App. No. 63/584,126 filed Sep. 20, 2023, the content of which is incorporated herein by reference in its entirety for all purposes.

BACKGROUND

The present disclosure is directed to capturing network traffic for analysis. Network usage patterns change over time as user roles and responsibilities change and as new applications are introduced. Networks are constantly being put to the test with the latest applications. As the demands and level of complexity grow, so does the possibility of an unexpected network failure. By proactively monitoring the network resources and resource usage, potential performance and security issues can be detected and addressed to reduce impacting a live system.

Network administrators are interested in monitoring and analyzing traffic flowing through their network to detect anomalies. Since monitoring all traffic is expensive, only a subset is actually monitored. Network administrators, for example, typically are interested in monitoring one or more applications running on the network. Setting up the network elements for monitoring involves identifying the set of switches where the traffic flows through and setting up policies for each switch interface. The entire process is manual and time consuming.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
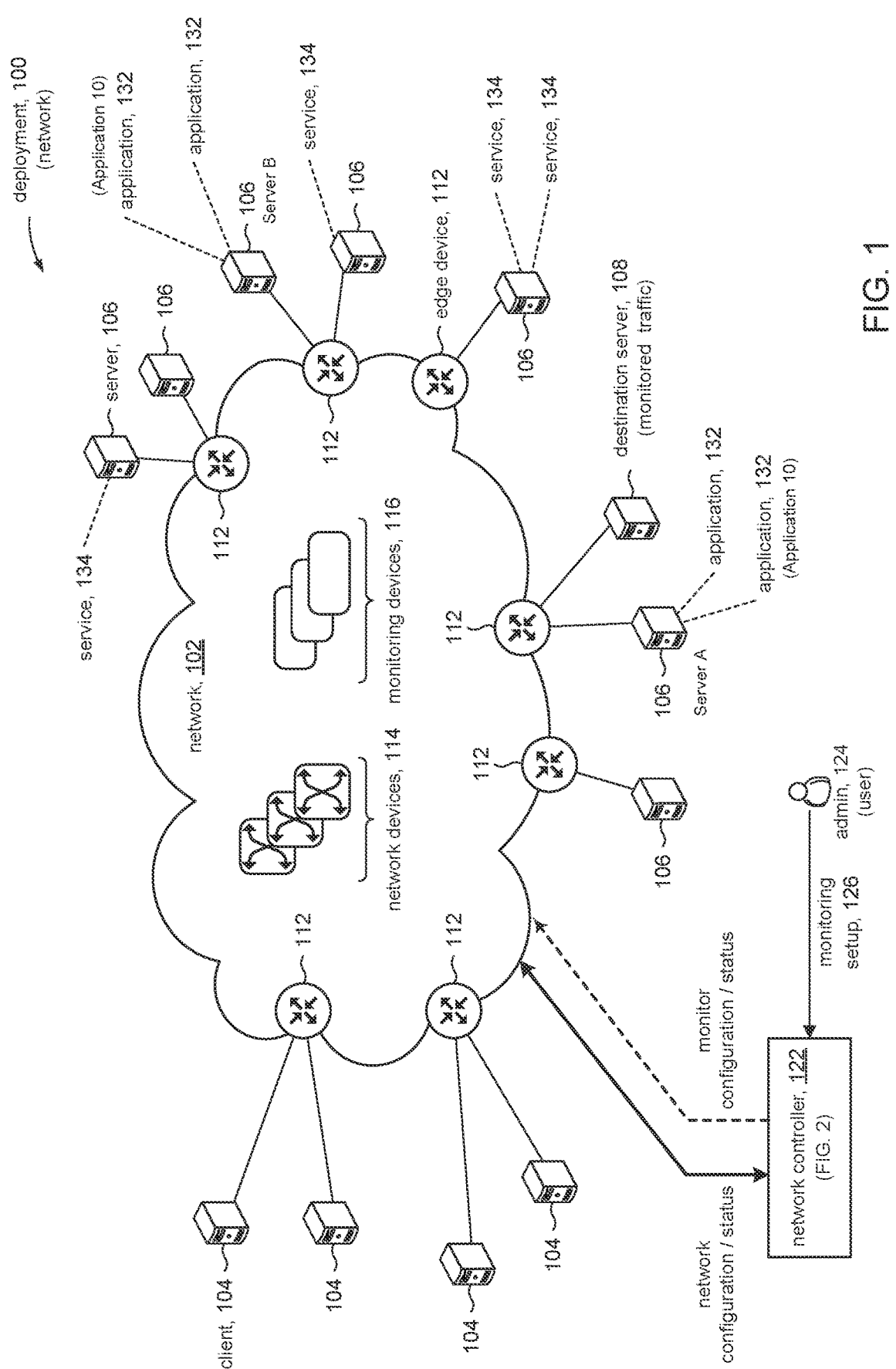
FIG. 1 represents a deployment to which the present disclosure can be applied.

The present disclosure is directed to capturing network traffic for analysis. More specifically, the present disclosure provides automated configuration of network devices (e.g., switches) in the production network to capture traffic associated with an application. Network administrators are interested in monitoring and analyzing traffic associated with an application that flows through their network, including traffic that flows between the application, the client (user), and services used by the application and the client such as databases, domain name server (DNS), etc.

The present disclosure provides a method to automate setting up a monitoring session for an application. The user can set up a monitoring session by specifying the application to be monitored and one or more monitoring destinations (e.g., monitoring tools, monitoring fabric, etc.). In some embodiments, the present disclosure includes an application diagnostics service that identifies (e.g., from a user via a CLI) an application to be monitored and monitoring destination(s) for receiving monitored traffic.

Using the network topology, the diagnostics service can identify the servers that host the application (e.g., web server) and the services it uses. For each server, the diagnostics service can identify the one or more network devices and the one or more interfaces to which the server is connected. For each network device and interface on the network device, the diagnostics service can program the network device to capture and mirror traffic associated with the application, and forward the captured traffic to the user-specified monitoring destination(s). Traffic associated with the application includes traffic between the client and the application, and traffic between the application and services used by the application.

An aspect of the present disclosure is an application discovery service that includes an application programming interface (API) to define the application itself (application definition), including the services used by the application, the server(s) that host the application and the server(s) that host the services used by the application. The application can be defined in various ways, including user-provided configuration information that associates the application and services with servers. The servers can be identified by their IP addresses, by labels (e.g., multipath label switching, MPLS), and the like. The application discovery service can access information that associates IP addresses or labels to network devices (e.g., switches) and interfaces on those devices. In some embodiments, application discovery can occur autonomously, for example, with deep packet inspection to look into the network traffic to determine the application to which the traffic belongs and hence discover the presence of the application in the network. By analyzing the packets, the application and its services can be discovered, along with the servers that host the application and services and associated network devices.

Another aspect of the present disclosure is a dynamic configuration service that monitors the state of the application and services, and the network devices behind the servers on which the applications and services run. Changes in device state can serve to trigger the application diagnostic service to reconfigure the devices as needed to continue capturing the application-specific traffic.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a high level diagram illustrating a generalized representation of a deployment 100 to which the techniques in accordance with the present disclosure can be applied. Deployment 100 can include a network 102 to provide communication between clients 104 and servers 106 via network edge devices 112. Servers 106 (e.g., web server) can host applications 132 that clients 104 (e.g., web clients) want to access, such as video conferencing, video streaming, etc., and services 134 to support the applications, such as DNS servers, database servers, etc.

Network 102 can include network devices 114 for switching and/or routing packets in accordance with one or more communication protocols such as IPv4, IPv6, MPLS, etc. Network 102 can include monitoring devices (tools) 116 to monitor traffic between network edge devices 112 and network devices 114. In some embodiments, some of the network devices 114 can be configured with traffic monitoring capability; e.g., to monitor and mirror traffic flow across a port. In accordance with some embodiments, monitored traffic can be mirrored to a server 108 designated as a destination for the monitored traffic.

The network 102 can be configured and maintained by a network controller. An example of a network controller is the CloudVision® network management platform developed and sold/licensed by Arista Networks, Inc. of Santa Clara, California. In accordance with the present disclosure network controller 122 can include a suitable user interface (e.g., local CLI, Web access, etc.) to allow users such as network administrators 124 to access configuration services to configure network devices 114 and to read status information (e.g., learned addresses, port state, etc.) from the network devices. In accordance with some embodiments, network controller 122 can also include application monitoring services to configure network devices 114 and monitoring devices 116 to setup monitoring 126 of application-specific traffic flow in network 102.

Figure 2:
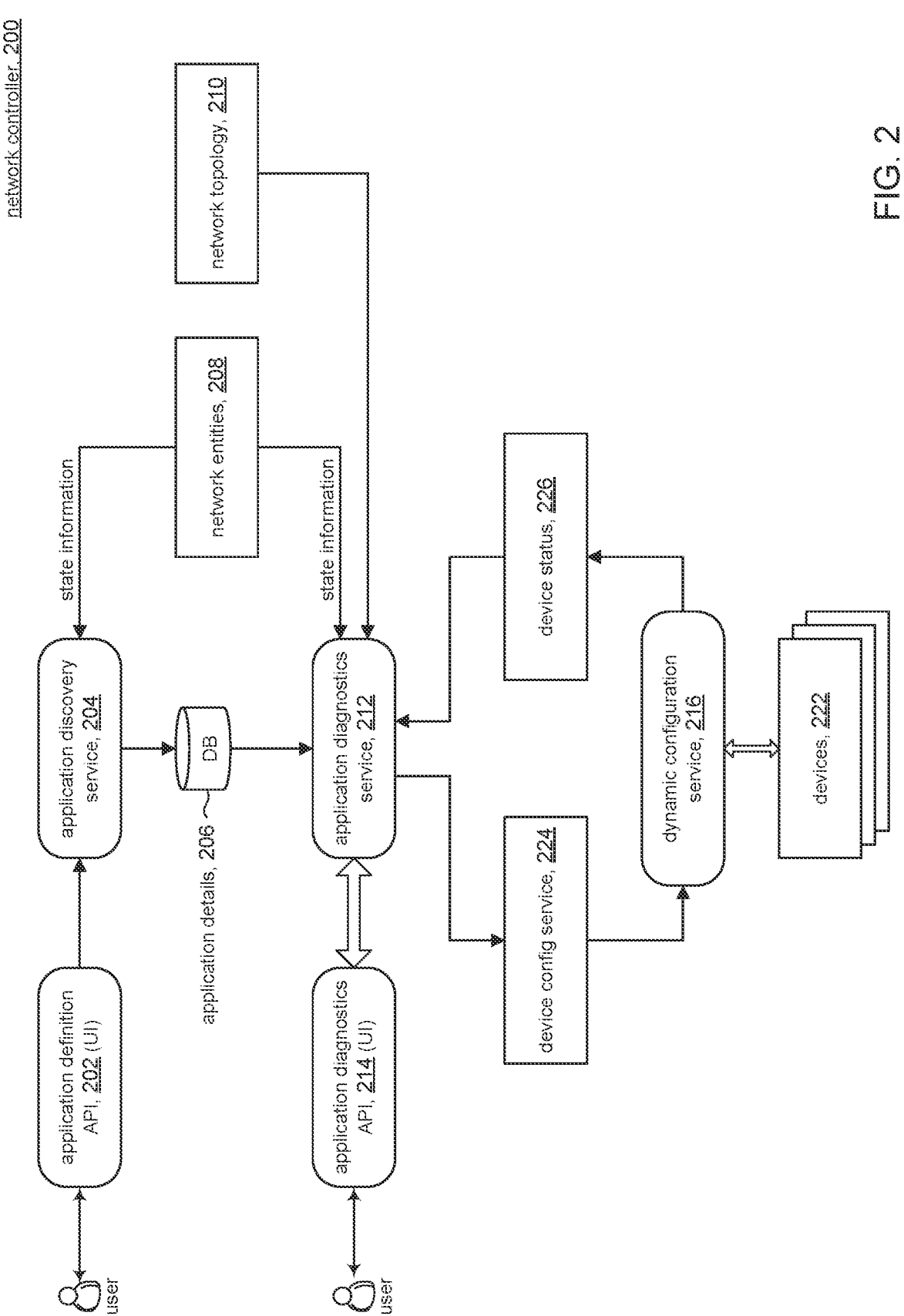
FIG. 2 is a high level block diagram of elements in a network controller in accordance with some embodiments of the present disclosure.

FIG. 2 shows a high level block diagram representation of elements in a network controller 200 to enable application monitoring in accordance with some embodiments of the present disclosure. Network controller 200 can include an application definition API 202 that allows a user to define applications (e.g., 132) via a suitable user interface; e.g., a command line interface (CLI), web access, etc.

Data entered by a user via application definition API 202 can feed into the application discovery service 204 to define/specify (application definition) an application of interest to be monitored. The application definition can include the services used by the application, the server(s) that host the application and the services used by the application, and the network devices that can reach those servers. The application discovery service can build up application details and store the details in an application details database (DB) 206.

It will be appreciated that an application for monitoring can be defined by an automated process instead of by a user. In some embodiments, for example, an application of interest can be defined by deep packet inspection, where the traffic can be analyzed to identify the services used by the application, their hosting servers, and network devices associated with an application of interest. In other embodiments, an application can be defined via metadata associated with the server(s) that host the application. The metadata can explicitly identify the services used by the application, the servers that host the services, and so on.

A network entities service 208 can maintain a list of all the network devices (e.g., switches, routers, etc.) in the deployment. The network entities service can collect/update state information about the network devices 112 in the deployment, and serve as a repository of this state information, such as up/down state of the network device, port configuration, up/down state of device interfaces and sub-interfaces, and the like. information about the network devices in the deployment is collected and updated as part managing the network. For example, when a new network device is installed in the network, the network entities service 208 can receive information about the new network device. Likewise, if a network device is taken off line, the network entities service 208 can be informed. If a configuration change is made, the network entities service 208 can be informed. Notably, the network entities service 208 collects and maintains this information as part of the process of managing the network, and is an activity independent of defining an application in accordance with the present disclosure.

A network topology service 210 develops and maintains connectivity information (e.g., connection graph) that represents the interconnections between the network devices in the deployment. The network topology service can monitor changes in the interconnectivity between devices to maintain a current view of the topology, such as the up/down state of devices, device interfaces, and the like. As with the network entities service 208, the network topology service 210 collects and maintains network topology information as part of the process of managing the network, and is an activity independent of defining an application in accordance with the present disclosure.

An application diagnostics service 212 can facilitate setting up a monitoring session to monitor an application. The application diagnostics service can include an application diagnostics API that allows a user (e.g., via a CLI) to specify an application to be monitored, and to specify a destination for storing the monitored traffic associated with the specified application. In some embodiments, the application diagnostics services 212 can communicate with the device configuration service 224 to set up the devices 222 (e.g., network devices, monitoring devices) to monitor the traffic flow for an application.

A dynamic configuration service 216 can communicate with devices 222 to configure the devices to capture the traffic flow for an application. The dynamic configuration service 216 can report any changes in device configuration or device failures to a device status server 226. The device status service 226 can feed this information back to the application diagnostics service 212 to be reported to the user.

Figure 3:
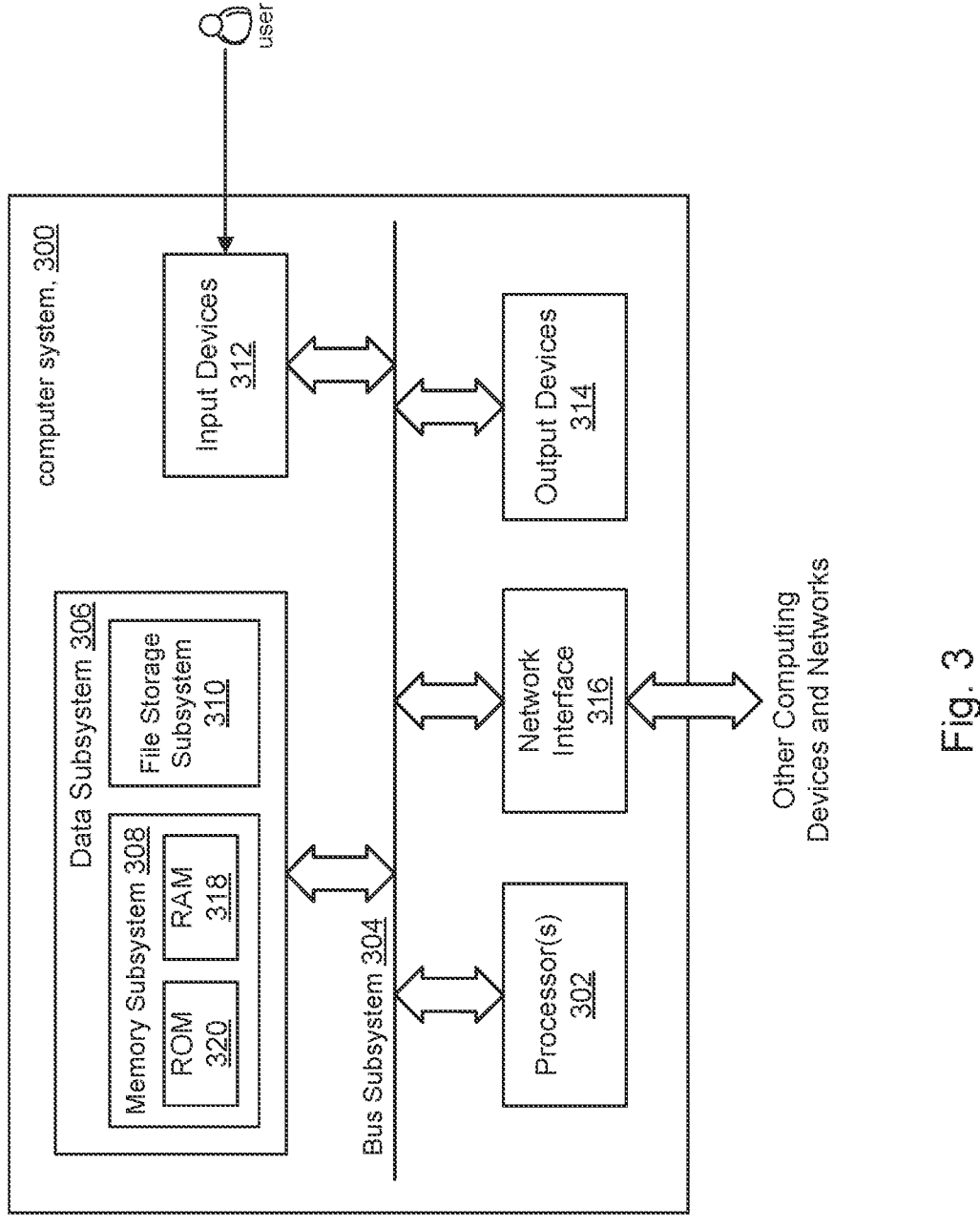
FIG. 3 is a simplified block diagram of an example computer system according to certain embodiments.

FIG. 3 depicts a simplified block diagram of an example computer system 300 according to certain embodiments. Computer system 300 can be used to implement network controller 122 (FIG. 1) or 200 (FIG. 2) in accordance with the present disclosure. As shown in FIG. 3, computer system 300 includes one or more processors 302 that communicate with a number of peripheral devices via bus subsystem 304. These peripheral devices include data subsystem 306 (comprising memory subsystem 308 and file storage subsystem 310), user interface input devices 312, user interface output devices 314, and network interface subsystem 316.

Bus subsystem 304 can provide a mechanism that enables the various components and subsystems of computer system 300 to communicate with each other as intended. Although bus subsystem 304 is shown schematically as a single bus, alternative embodiments of the bus subsystem can utilize multiple busses.

Network interface subsystem 316 can serve as an interface for communicating data between computer system 300 and other computer systems or networks. Embodiments of network interface subsystem 316 can include, e.g., an Ethernet card, a Wi-Fi and/or cellular adapter, a modem (telephone, satellite, cable, ISDN, etc.), digital subscriber line (DSL) units, and/or the like.

User interface input devices 312 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 300.

User interface output devices 314 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 300.

Data subsystem 306, comprising memory subsystem 308 and file/disk storage subsystem 310, represents non-transitory computer-readable storage media that can store program code and/or data, which when executed by processor 302, can cause processor 302 to perform operations in accordance with embodiments of the present disclosure.

Memory subsystem 308 includes memory circuits such as main random access memory (RAM) 318 for storage of instructions and data during program execution and read-only memory (ROM) 320 in which fixed instructions are stored. File storage subsystem 310 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 300 is illustrative and many other configurations having more or fewer components than system 300 are possible.

Figure 4:
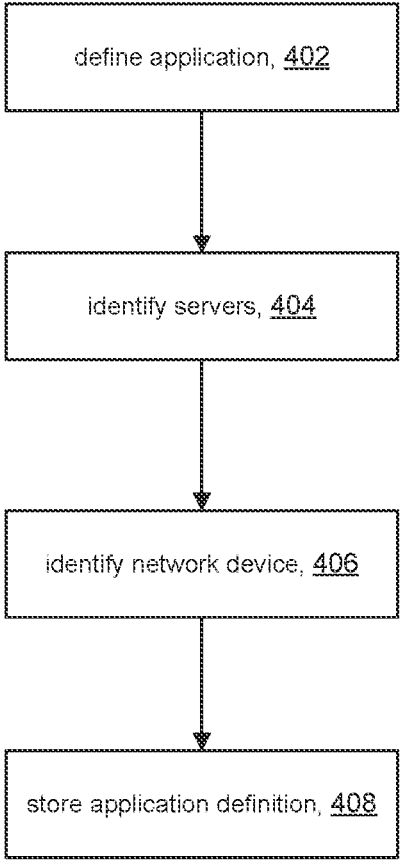
FIG. 4 is a high level description of processing to define an application in accordance with the present disclosure.

Referring to FIG. 4, the discussion will now turn to a high level description of processing in the network controller (e.g., 122, FIG. 1, 200, FIG. 2) to define an application in accordance with the present disclosure. In some embodiments, for example, the network controller can include computer executable program code (e.g., stored on a non-transitory computer-readable storage memory device), which when executed by a processor (e.g., 302, FIG. 3), may cause the computer system to perform the processing in accordance with FIG. 4. The operation and processing blocks described below are not necessarily executed in the order shown. Operations can be combined or broken out into smaller operations in various embodiments. Operations can be allocated for execution among one or more concurrently executing processes and/or threads.

At operation 402, the network controller can receive input (via a suitable UI using the application definition API 202) from a user to define an application. An application can be defined in terms of the services 134 (FIG. 1) that it uses. A video conferencing application, for example, may comprise a video service to transmit the video, a recording service to record the meeting, a transcript service to generate a transcript of the meeting, and so on. The services that make up the application can be hosted on the same server or they can be spread across a number of different servers.

The user can input the IP address of the server (or servers) that run the application. In some embodiments, an application may be distributed across multiple servers, in which case the application can be identified by the IP addresses of the multiple servers that host the application. FIG. 1, for example, shows two instances of Application 10, which run respectively on Server A and Server B. The user can also input the IP addresses of the servers that run the services used by the application.

At operation 404, the network controller (e.g., application discovery service 204) can identify the one (or more) servers that host the application and its services. The servers can be identified by their Internet Protocol (IP) addresses, by Multiprotocol Label Switching (MPLS) labels, and the like. Likewise, the network controller can identify the one (or more) servers that host the services used by the application; i.e., the servers on which the services run. The network controller can leverage the information it has collected as part of its normal operations of managing the network to identify these servers, thus alleviating the user of the effort. For example, network topology information maintained by the network topology service 210 can be used to identify which server the application is hosted on.

At operation 406, the network controller (e.g., application discovery service 204), can identify network devices (e.g., switches, routers) that can reach the identified servers. The network controller can leverage the information it has collected as part of its normal operations of managing the network to identify these network devices, thus alleviating the user of the effort. For example, the network controller can use the network entities services 208 and the network topology services 210 already collected during the normal course of managing the network to identify network devices (e.g., switches, routers) that can reach the identified servers. For example, the network topology services can identify the network devices between the client 104 and the server that hosts the specified application. Likewise, the network topology services can identify the network devices between the server that hosts the specified application and the servers that host the services used by the applications.

At operation 408, the application is defined in terms of the network elements in the network. In some embodiments, the user can initially specify IP subnets or server metadata such as labels and need not specify the exact IP address. As, and when, servers in the specified subnet or metadata show up in the network, the application can be autonomously associated with that server without further human interaction. The network controller in accordance with the present disclosure can store the application definition collected for the application in a suitable data store such as application details DB 206. Details can include an identifier or a name of the application that a user can use to identify the application. The application details DB 206 can include the list of services used by the application, and the IP addresses of the corresponding servers that host the application and services. The application details DB 206 can include a list of network devices and their (sub)interfaces that can reach that server.

Figure 5:
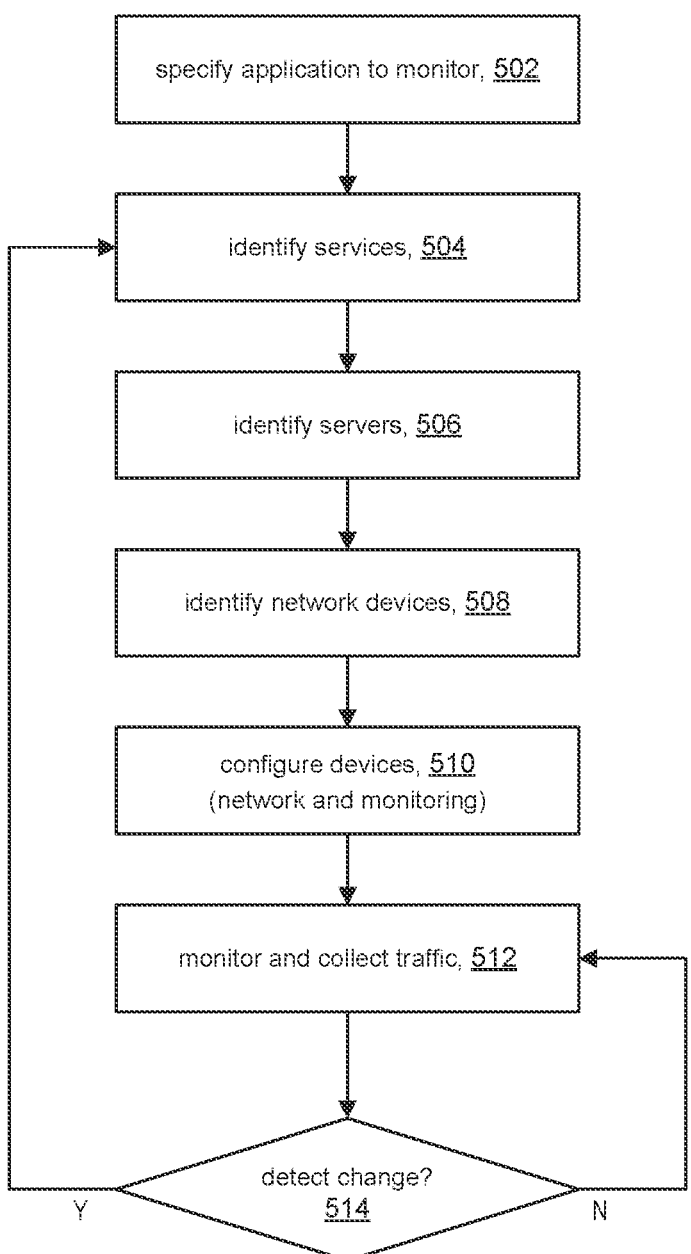
FIG. 5 is a high level description of processing to initiate monitoring of an application in accordance with the present disclosure.

Referring to FIG. 5, the discussion will now turn to a high level description of processing in the network controller (e.g., 122, FIG. 1, 200, FIG. 2) to set up a monitoring session to monitor an application in accordance with the present disclosure. In some embodiments, for example, the network controller can include computer executable program code (e.g., stored on a non-transitory computer-readable storage memory device), which when executed by a processor (e.g., 302, FIG. 3), may cause the computer system to perform the processing in accordance with FIG. 5. The operation and processing blocks described below are not necessarily executed in the order shown. Operations can be combined or broken out into smaller operations in various embodiments. Operations can be allocated for execution among one or more concurrently executing processes and/or threads.

At operation 502, the network controller can receive input (e.g., via a suitable UI using the application diagnostics API 214) from a user (e.g., client 104) to specify an application to be monitored. The UI can present a list of defined applications to the user. In some embodiments, the user can specify parameters of the monitoring activity, such as monitoring all the traffic, monitoring the first N packets of a session, etc. The user also specify a destination for collecting the traffic associated with the application, and so on.

At operation 504, the network controller (e.g., application diagnostics service 212) can identify the services used by the specified application using, for example, information contained in the application details DB 206.

At operation 506, the network controller (e.g., application diagnostics service 212) can identify the server(s) associated with the specified application. As noted above, the services used by an application can reside in servers separate from that of the application. For example, an application may access a database on a database server. Accordingly, the network controller can likewise identify the servers associated with the identified services using, for example, information contained in the application details DB 206.

At operation 508, the network controller (e.g., application diagnostics service 212) can identify the network devices that carry traffic between the identified servers, for example, using the network entities services 208 and the network topology services 210. For example, the network controller can identify the network devices that can carry traffic between the client and the server that runs the specified application. In addition, the network controller can identify the network devices that can carry traffic between the server that runs the specified application and the servers that run the services used by the specified application.

At operation 510, the network controller (e.g., application diagnostics service 212) can program or otherwise configure devices to monitor the application-specific traffic. In some embodiments, the network controller can program network devices (switches, routers, etc.) with rules to capture and mirror the application-specific traffic to a destination; e.g., by matching on the source or destination address with the IP address of the application server). In some embodiments, the deployment includes monitoring devices to monitor performance, availability, traffic, security, etc. The network controller can configure such devices to monitor application-specific traffic. The monitored traffic can be forwarded to a suitable collector device; e.g., destination server 108, FIG. 1.

At operation 512, the monitoring session has been set up. Notably, the session setup did not require any input from the user beyond specifying which application to monitor and where to collect the monitored application-specific traffic. Instead, the network controller has autonomously identified the elements associated with the application to be monitored; e.g., servers and network devices. The network controller has configured the network devices and/or the monitoring devices to monitor and collect application-specific network traffic. At operation 512, the configured devices can monitor network traffic for traffic related to the specified application and collect the application-specific traffic. As noted above, application-specific traffic includes client-to-application traffic and application-to-service traffic.

At decision point 514, if a change in the network is detected, the network controller can repeat the process shown in FIG. 4 to update the application definition to reflect any changes that affect the application definition. Processing can repeat operations 504 to 512 to reconfigure the network elements to continue the monitoring session with the new configuration. For example, a change can occur if servers that host the application are added or removed. A network device or an interface on a network device associated with the application may fail, resulting in a change in network topology.

Figure 6:
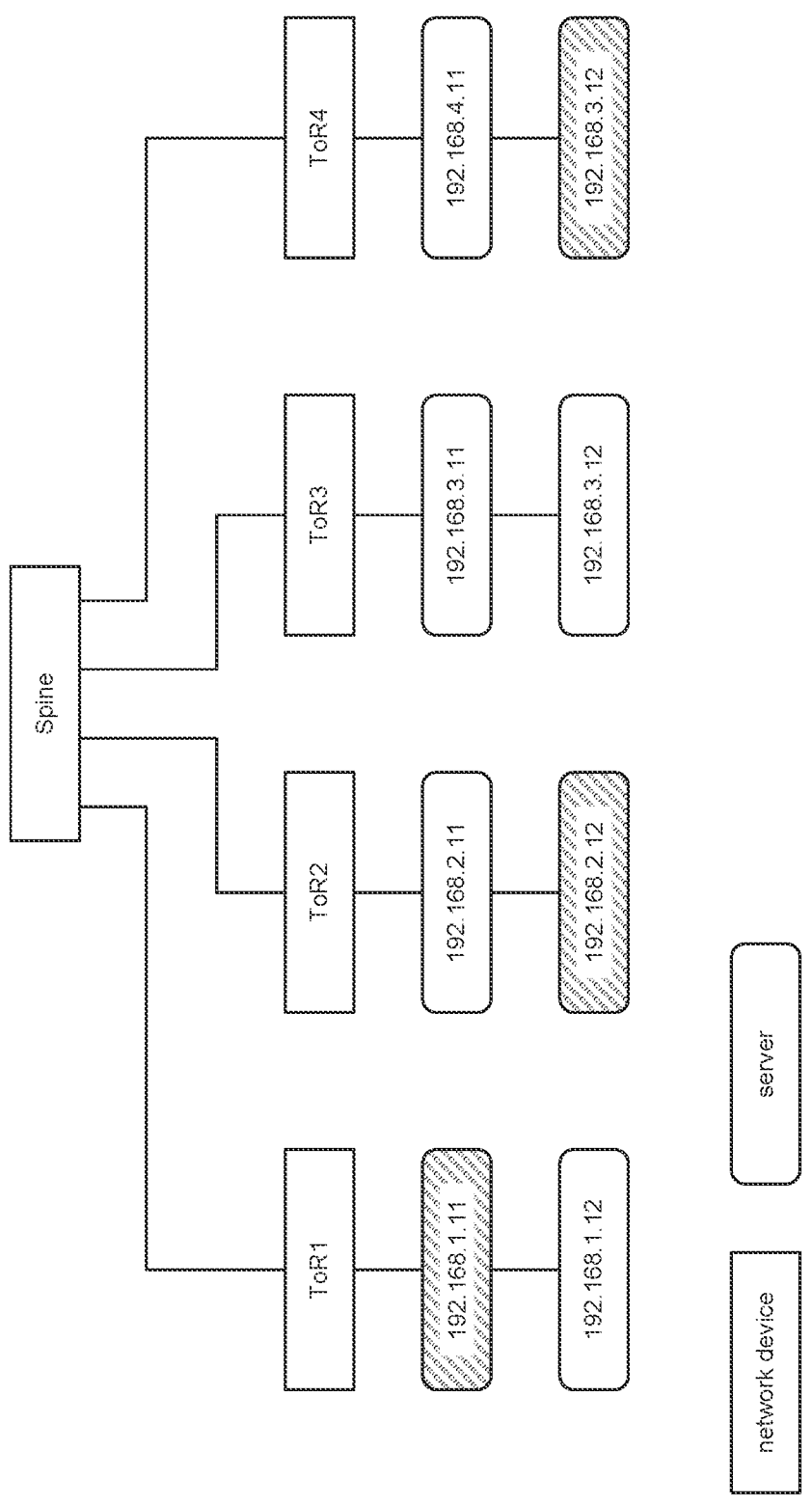
FIG. 6 illustrates an example of application definition.

FIG. 6 illustrates an example of a monitoring session in a network that can be autonomously set up by a network controller in accordance with the present disclosure. The network shown in FIG. 6 is an example of a spine-leaf architecture. The spine and top-of-rack (ToR) devices form the switching layers of the network. The servers (leaves) are interconnected by way of their connections to the ToRs.

Suppose, for example, an application is installed at the server at 192.168.1.11 hosts the application (e.g., a web server). Suppose further that servers at 192.168.2.12 and 192.168.3.12 host services that the application uses; e.g., a DB, video processing. When the application is defined, the user can provide the IP addresses of the application and of the services used by the application. The network controller in accordance with the present disclosure can define the application:

To define the application, the user need only provide the above IP addresses.

The network controller autonomously identifies the servers based on the IP addresses.

The network controller autonomously identifies the network devices. For example, the server at 192.168.1.11 communicates with the server at 192.168.2.12 via ToR 1, Spine, and ToR 2. This becomes part of the application definition that is stored in application details DB 206 (FIG. 2).

A monitoring session on this application can then be initiated. The user need only specify the application to be monitored and a destination where the monitored traffic is to be collected. The network controller can configure monitoring as follows:

Consult the application definition DB to obtain the network devices associated with the application.

Configure the network devices and/or one or more monitoring devices to capture and mirror the application-specific traffic.

Further Examples

Features described above as well as those claimed below may be combined in various ways without departing from the scope hereof. The following examples illustrate some possible, non-limiting combinations:

(A1) A method in a network management system for monitoring network traffic in a production network, the method comprising: receiving a request to monitor network traffic associated with an application running on the production network, the application accessing a plurality of associated services that support functions of the application; identifying a plurality of servers on which the application and the plurality of associated services run; identifying a plurality of network devices and interfaces on those network devices that can reach the plurality of servers; and configuring one or more of the plurality of network devices to capture data packets sent to and sent by the application.

(A2) For the method denoted as (A1), an application and its corresponding services are hosted on one or more servers.

(A3) For the method denoted as any of (A1) through (A2), the network traffic to be monitored comprises network traffic from multiple instances of the application running on different servers behind corresponding switches.

(A4) The method denoted as any of (A1) through (A3), further comprising discovering applications running in the production network, including identifying corresponding services used by the applications and identifying servers that host the applications and corresponding services.

(A5) The method denoted as any of (A1) through (A4), further comprising detecting changes in the application including addition or removal of one or more servers that host the application and/or the plurality of associated services and, in response thereto, updating configuration of network devices to which the one or more servers are connected.

(A6) The method denoted as any of (A1) through (A5), further comprising detecting a state change in one or more of the network devices that are configured to capture data packets associated with the application and, in response thereto, updating configuration of the one or more network devices.

(A7) For the method denoted as any of (A1) through (A6), configuring at least some of the plurality of network devices to capture data packets associated with the application includes enabling at least some of the plurality of network devices to mirror data packets associated with the application and transmit the mirrored data packets to a collector.

(B1) A network device one or more computer processors; and a computer-readable storage device comprising instructions for controlling the one or more computer processors to: receive a request to monitor network traffic associated with an application running on the production network, the application accessing a plurality of associated services that support functions of the application; identify a plurality of servers on which the application and the plurality of associated services run; identify a plurality of network devices and interfaces on those network devices that can reach the plurality of servers; and configure one or more of the plurality of network devices to capture data packets sent to and sent by the application.

(B2) For the network device denoted as (B1), an application and its corresponding services are hosted on one or more servers.

(B3) For the network device denoted as any of (B1) through (B2), the network traffic to be monitored comprises network traffic from multiple instances of the application running on different servers behind corresponding switches.

(B4) For the network device denoted as any of (B1) through (B3), the computer-readable storage device further comprises instructions for controlling the one or more computer processors to discover applications running in the production network, including identifying corresponding services used by the applications and identifying servers that host the applications and corresponding services.

(B5) For the network device denoted as any of (B1) through (B4), the computer-readable storage device further comprises instructions for controlling the one or more computer processors to detect changes in the application including addition or removal of one or more servers that host the application and/or the plurality of associated services and, in response thereto, update configuration of network devices to which the one or more servers are connected.

(B6) For the network device denoted as any of (B1) through (B5), the computer-readable storage device further comprises instructions for controlling the one or more computer processors to detect state change in one or more of the network devices that are configured to capture data packets associated with the application and, in response thereto, update configuration of the one or more network devices.

(B7) For the network device denoted as any of (B1) through (B6), configuring at least some of the plurality of network devices to capture data packets associated with the application includes enabling at least some of the plurality of network devices to mirror data packets associated with the application and transmit the mirrored data packets to a collector.

(C1) A non-transitory computer-readable storage device in a network device, the non-transitory computer-readable storage device having stored thereon computer executable instructions, which when executed, cause the network device to: receive a request to monitor network traffic associated with an application running on the production network, the application accessing a plurality of associated services that support functions of the application; identify a plurality of servers on which the application and the plurality of associated services run; identify a plurality of network devices and interfaces on those network devices that can reach the plurality of servers; and configure one or more of the plurality of network devices to capture data packets sent to and sent by the application.

(C2) For the non-transitory computer-readable storage device denoted as (C1), the network traffic to be monitored comprises network traffic from multiple instances of the application running on different servers behind corresponding switches.

(C3) For the non-transitory computer-readable storage device denoted as any of (C1) through (C2), the computer executable instructions, which when executed, further cause the network device to discover applications running in the production network, including identifying corresponding services used by the applications and identifying servers that host the applications and corresponding services.

(C4) For the non-transitory computer-readable storage device denoted as any of (C1) through (C3), the computer executable instructions, which when executed, further cause the network device to detect changes in the application including addition or removal of one or more servers that host the application and/or the plurality of associated services and, in response thereto, update configuration of network devices to which the one or more servers are connected.

(C5) For the non-transitory computer-readable storage device denoted as any of (C1) through (C4), the computer executable instructions, which when executed, further cause the network device to detect state change in one or more of the network devices that are configured to capture data packets associated with the application and, in response thereto, update configuration of the one or more network devices.

(C6) For the non-transitory computer-readable storage device denoted as any of (C1) through (C5), configuring at least some of the plurality of network devices to capture data packets associated with the application includes enabling at least some of the plurality of network devices to mirror data packets associated with the application and transmit the mirrored data packets to a collector.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network management system for monitoring network traffic in a production network, the method comprising:

receiving a request to monitor network traffic associated with an application running on the production network, the application accessing a plurality of associated services that support functions of the application;

in response to the request:

identifying a plurality of servers on which the application and the plurality of associated services run;

automatically identifying, based network entity information and network topology information maintained by the network management system, a plurality of network devices and interfaces on those network devices that can reach the plurality of servers; and configuring one or more of the plurality of network devices to capture data packets sent to and sent by the application;

detecting a state change in at least one network device configured to capture the data packets sent to and sent by the application; and in response to detecting the state change, reconfiguring the at least one network device to continue capturing the data packets sent to and sent by the application.

2. The method of claim 1, wherein the network traffic to be monitored comprises network traffic from multiple instances of the application running on different servers behind corresponding switches.

3. The method of claim 1, further comprising discovering applications running in the production network, including identifying corresponding services used by the applications and identifying servers that host the applications and corresponding services.

4. The method of claim 1, further comprising detecting changes in the application including addition or removal of one or more servers that host the application and/or the plurality of associated services and, in response thereto, updating configuration of network devices to which the one or more servers are connected.

5. The method of claim 1, wherein configuring at least some of the plurality of network devices to capture data packets associated with the application includes enabling at least some of the plurality of network devices to mirror data packets associated with the application and transmit the mirrored data packets to a collector.

6. A network device comprising:

one or more computer processors; and a computer-readable storage device comprising instructions for controlling the one or more computer processors to:

receive a request to monitor network traffic associated with an application running on the production network, the application accessing a plurality of associated services that support functions of the application;

in response to the request:

identify a plurality of servers on which the application and the plurality of associated services run;

automatically identify, based network entity information and network topology information maintained by the network management system, a plurality of network devices and interfaces on those network devices that can reach the plurality of servers; and configure one or more of the plurality of network devices to capture data packets sent to and sent by the application;

detect a state change in at least one network device configured to capture the data packets sent to and sent by the application; and in response to detecting the state change, reconfigure the at least one network device to continue capturing the data packets sent to and sent by the application.

7. The network device of claim 6, wherein the network traffic to be monitored comprises network traffic from multiple instances of the application running on different servers behind corresponding switches.

8. The network device of claim 6, wherein the computer-readable storage device further comprises instructions for controlling the one or more computer processors to discover applications running in the production network, including identifying corresponding services used by the applications and identifying servers that host the applications and corresponding services.

9. The network device of claim 6, wherein the computer-readable storage device further comprises instructions for controlling the one or more computer processors to detect changes in the application including addition or removal of one or more servers that host the application and/or the plurality of associated services and, in response thereto, update configuration of network devices to which the one or more servers are connected.

10. The network device of claim 6, wherein configuring at least some of the plurality of network devices to capture data packets associated with the application includes enabling at least some of the plurality of network devices to mirror data packets associated with the application and transmit the mirrored data packets to a collector.

11. A non-transitory computer-readable storage device in a network device, the non-transitory computer-readable storage device having stored thereon computer executable instructions, which when executed, cause the network device to:

receive a request to monitor network traffic associated with an application running on the production network, the application accessing a plurality of associated services that support functions of the application;

in response to the request:

identify a plurality of servers on which the application and the plurality of associated services run;

automatically identify, based network entity information and network topology information maintained by the network management system, a plurality of network devices and interfaces on those network devices that can reach the plurality of servers; and configure one or more of the plurality of network devices to capture data packets sent to and sent by the application;

detect a state change in at least one network device configured to capture the data packets sent to and sent by the application; and in response to detecting the state change, reconfigure the at least one network device to continue capturing the data packets sent to and sent by the application.

12. The non-transitory computer-readable storage device of claim 11, wherein the network traffic to be monitored comprises network traffic from multiple instances of the application running on different servers behind corresponding switches.

13. The non-transitory computer-readable storage device of claim 11, wherein the computer executable instructions, which when executed, further cause the network device to discover applications running in the production network, including identifying corresponding services used by the applications and identifying servers that host the applications and corresponding services.

14. The non-transitory computer-readable storage device of claim 11, wherein the computer executable instructions, which when executed, further cause the network device to detect changes in the application including addition or removal of one or more servers that host the application and/or the plurality of associated services and, in response thereto, update configuration of network devices to which the one or more servers are connected.

15. The non-transitory computer-readable storage device of claim 11, wherein configuring at least some of the plurality of network devices to capture data packets associated with the application includes enabling at least some of the plurality of network devices to mirror data packets associated with the application and transmit the mirrored data packets to a collector.

16. The method of claim 1, wherein the state change is a failure of the at least one network device or a failure of an interface of the at least one network device.

17. The network device of claim 6, wherein the state change is a failure of the at least one network device or a failure of an interface of the at least one network device.

18. The non-transitory computer-readable storage device of claim 11, wherein the state change is a failure of the at least one network device or a failure of an interface of the at least one network device.

* * * * *